United States Patent [19]

Hilpert

[11] 4,062,187

[45] Dec. 13, 1977

[54] APPARATUS AND METHOD FOR CONTROLLING KINETICS OF TORQUE CONVERTER FOR HOIST DRUM DRIVE OF CRANE

[75] Inventor: Conrad R. Hilpert, Manor, Pa.

[73] Assignee: Harnischefeger Corporation, W. Milwaukee, Wis.

[21] Appl. No.: 711,840

[22] Filed: Aug. 5, 1976

[51] Int. Cl.² ............................................. F16D 33/02
[52] U.S. Cl. ....................................... 60/326; 60/327; 60/336; 60/486; 60/905
[58] Field of Search .................. 60/326, 327, 329, 336, 60/347, 352, 358, 453, 468, 486, 494, 905

[56] References Cited

U.S. PATENT DOCUMENTS

| | | | |
|---|---|---|---|
| B 261,139 | 4/1943 | Waltenbauer | 60/326 |
| 3,063,245 | 11/1962 | Rippy | 60/336 |
| 3,417,565 | 12/1968 | Hanson et al. | 60/336 |

*Primary Examiner*—Edgar W. Geoghegan
*Attorney, Agent, or Firm*—James E. Nilles

[57] ABSTRACT

The hoist drum of a mobile crane employs a controllable kinetics torque converter for transmitting power from a prime mover to the hoist drum. Apparatus and method are provided for controllably varying the density of the working fluid in the torque converter to regulate the capacity thereof and for keeping the variable density working fluid above a predetermined pressure level so as to prevent unwanted cavitation. The apparatus comprises means for supplying to the torque converter a working fluid comprising a mixture of liquid and gas, means for maintaining the fluid above a predetermined pressure level to inhibit cavitation in the working fluid, and means for selectively varying the density of the working fluid to selectively vary the capacity of the torque converter by varying the volumetric proportions between the liquid and the gas. The method generally comprises the steps of supplying working fluid to a torque converter comprising a mixture of liquid and gas, varying the proportion of liquid to gas to vary the density of the working fluid and to vary the torque converter capacity, and maintaining the fluid above a predetermined pressure level to prevent cavitation in the working fluid.

26 Claims, 2 Drawing Figures

APPARATUS AND METHOD FOR CONTROLLING KINETICS OF TORQUE CONVERTER FOR HOIST DRUM DRIVE OF CRANE

BACKGROUND OF THE INVENTION

1. Field of Use

This invention relates generally to a controlled kinetics torque converter for transmitting power between a prime mover and a hoist drum in a mobile crane. In particular, the invention relates to apparatus and method for varying the density of the working fluid in the torque converter to regulate the capacity thereof and for keeping the working fluid above a predetermined pressure level to prevent unwanted cavitation.

2. Description of the Prior Art

In some mobile cranes, it is the practice to employ friction-type clutches between the prime mover and the hoist drum. However, clutch drives of this character introduce problems of control arising from order of magnitude variations of the coefficient of friction of the clutch surfaces under varying load and operating conditions. To avoid these problems, some prior art cranes employ a torque converter between the prime mover and the hoist drum and means are provided to adjust the angle of the torque converter stator blades to change the capacity of the torque converter while the prime mover operates at a constant speed. More specifically, for example, a three stage stationary housing torque converter comprises a bladed impeller mounted on an input shaft connected to the prime mover, a bladed turbine mounted on an output shaft connected to the hoist drum drive shaft, and stator blades which are mounted in the stationary housing and are angled to redirect a working medium such as oil from the impeller blades onto the turbine blades. Initially, the turbine will begin to rotate as the momentum of the oil provided by the impeller is absorbed by the turbine and the output shaft is accelerated. When the turbine is stopped, the torque converter is "stalled," and the oil flow is predominantly along the design path or torus in the housing of the torque converter. This helical oil flow path provides a speed reduction from input shaft to output shaft with a commensurate torque increase to provide conservation of work energy less viscous losses. As the turbine speed approaches impeller speed, the oil flow is predominantly in the same direction as the rotation of the turbine, and output torque drops to the level of input torque. The relationship between input and output torques and speeds is determined by the construction of the torque converter and by the density of the working fluid. The torque multiplication as a function of speed ratio, where speed ratio = (output speed/input speed), varies with the number of stator and turbine blades and the angles and shape of the individual blades. For maximum efficiency, the ideal torque converter working fluid would have minimum viscosity, to minimize losses, and maximum density since the action of the torque converter is basically the transfer of momentum.

In operating a crane, a given load, lifted by a given engine at a given speed through a given torque converter, will rise at a certain fixed speed. To control movement of a load with an engine at constant speed, the amount of power transmitted through the torque converter must be infinitely variable. To provide a range of control over the power transmitted through a torque converter, either the converter construction or the fluid density must be varied. As hereinbefore mentioned, some torque converter designs permit continuous adjustment of the angle or the effective area of the torque converter stator blades, and this provides for control over a limited range.

As hereinbefore mentioned, control is also possible if the density of the working fluid can be varied.

As is well known, a simple reduction of the amount of working fluid in the torque converter will not permit controllable power transmission. The partially filled torque converter will transmit less power, but the level of reduction will fluctuate. Cavitation will occur at a rate dependent upon input and output power. Draining oil from the torque converter will reduce output speed and increase cavitation which will lessen the power output further, thereby lessening output speed, increasing cavitation, and so forth. On the other hand, increasing the working fluid level will cause the opposite, self-exciting instability.

It is also well established that a hydrokinetic torque converter can be "unloaded" by reducing the internal fluid pressure of the working fluid and allowing cavitation to occur. This produces a reduction of output torque, input torque, and usually a loss of efficiency. The action is not smoothly controllable because the cavitation builds up and decreases with speed ratio change and with input power change and speed change. Generally, the effect is for the working fluid to cavitate more as the speed ratio decreases below the peak efficiency point and to cavitate more as input speed increases and as input power increases.

The control of most loads is not controllable by lowering the internal pressure of the working fluid. The load causing cavitation as pressure is reduced will slow to a lower speed ratio causing more cavitation which produces less torque resulting in an even lower speed ratio and so forth. As cavitation increases, less and less working fluid is available in the torque converter and cavitation increases uncontrollably. Input torque is reduced allowing the prime mover to speed up causing more cavitation and loss of load control. A pressure increase imposed on the working fluid will cause a self-regeneration sequence in the reverse order; the result being an uncontrolled "picking up" of the load.

The following patents exemplify hydrodynamic transmissions or fluid couplings wherein attempts are made to control or regulate those devices by controlling the working medium supplied thereto: U.S. Pat. Nos. 2,768,722; 3,382,959; 3,844,120; and 3,724,209.

SUMMARY OF THE INVENTION

In accordance with the present invention, there is provided a controllable kinetics torque converter for transmitting power from a prime mover to a hoist drum of a mobile crane. Apparatus and method are provided for controllably varying the density of the working fluid in the torque converter to regulate the capacity thereof and for keeping the variable density working fluid above a predetermined pressure level to prevent unwanted cavitation in the working fluid.

It is known that the capacity of a torque converter varies directly as the density of the working fluid. In accordance with the present invention, a variable density working fluid is produced by providing a mixture of liquid, such as oil, and gas, such as air, to a torque converter, maintaining the fluid above a predetermined pressure level to keep the working fluid under pressure and prevent undesired cavitation, and by varying the proportion between the liquid and gas to vary the density of the working medium and thereby vary the capacity of the torque converter. More specifically, the density of the working fluid is controlled by supplying a controlled flow rate of liquid to the torque converter torus (which is, in effect, a sealed chamber except for the inlet and outlet ports thereof) and by supplying high pressure gas to the torus and maintaining the working fluid (liquid/gas, liquid alone, or gas alone) at high pressure therein, while simultaneously removing the mixture of liquid and gas (in the form of foam), or the liquid alone or the gas alone. The working fluid is removed at a flow rate which is relatively equal to or higher than the variable flow rate at which the working fluid is being supplied to the torus, but pressure on the working fluid, regardless of the rate of removal, is maintained above a predetermined level.

The liquid is supplied by a variable pump means capable of delivering a variable amount of liquid (for example, zero to more than 70 gallons per minute). The liquid pump means can be either a variable displacement pump or an equivalent system including a fixed displacement pump and appropriate valving. The gas is supplied by a compressor capable of delivering a variable amount of gas (for example, zero to more than 70 gallons per minute) at a relatively high pressure (for example, in a range of from 40 to 50 psi). The working fluid (i.e., a mixture of liquid and gas, or liquid alone, or gas alone, depending on proportion) is removed from the torus by a fixed displacement outlet pump capable of removing a fixed volume of fluid (for example, 70 gallons per minute). The inlet flow rate is variable from essentially zero (or a very low rate) to a flow rate exceeding that of the outlet pump. This results in the mixture density being capable of going from that of pure liquid to that of nearly pure gas (very like foam). Cavitation is unable to create a self-purging of oil from the circuit because the pressure in the torus is held constant at a relatively high level (40 to 50 psi) and the ratio of liquid to gas in the torus is held approximately to the inlet and outlet pump displacement ratio.

The apparatus and method in accordance with the invention enables very smooth, step-free control of loads and enables smooth variations in load speed from zero to maximum speed whether being raised or lowered. In particular, a torque converter of the invention allows a smooth step-free control of power transmitted through a torque converter over the range of zero to 100% of the normal level at the given speed ratio. Variation of the density of the working fluid offers the smoothness and control associated with steam powered or hydrostatic equipment but with the efficiency and low initial cost of a torque converter drive. Problems associated with conventional clutch drives are obviously eliminated. A torque converter in accordance with the invention enables load control to be effected in the most desired low speed ratios where the shock losses in the torque converter circuit are greatest. The variable density working fluid remains "foamed up" in a uniform manner and acts as a true low density liquid. Thus, the capacity of the torque converter can be varied at will by the operator. Furthermore, the apparatus for varying the density of the working fluid in the controlled kinetics torque converter and for preventing cavitation in the working fluid thereof is relatively economical to construct and can be applied to torque converters during manufacture or to torque converters in the field.

Other objects and advantages of the invention will hereinafter appear.

DESCRIPTION OF A PREFERRED EMBODIMENT

Figure 1:
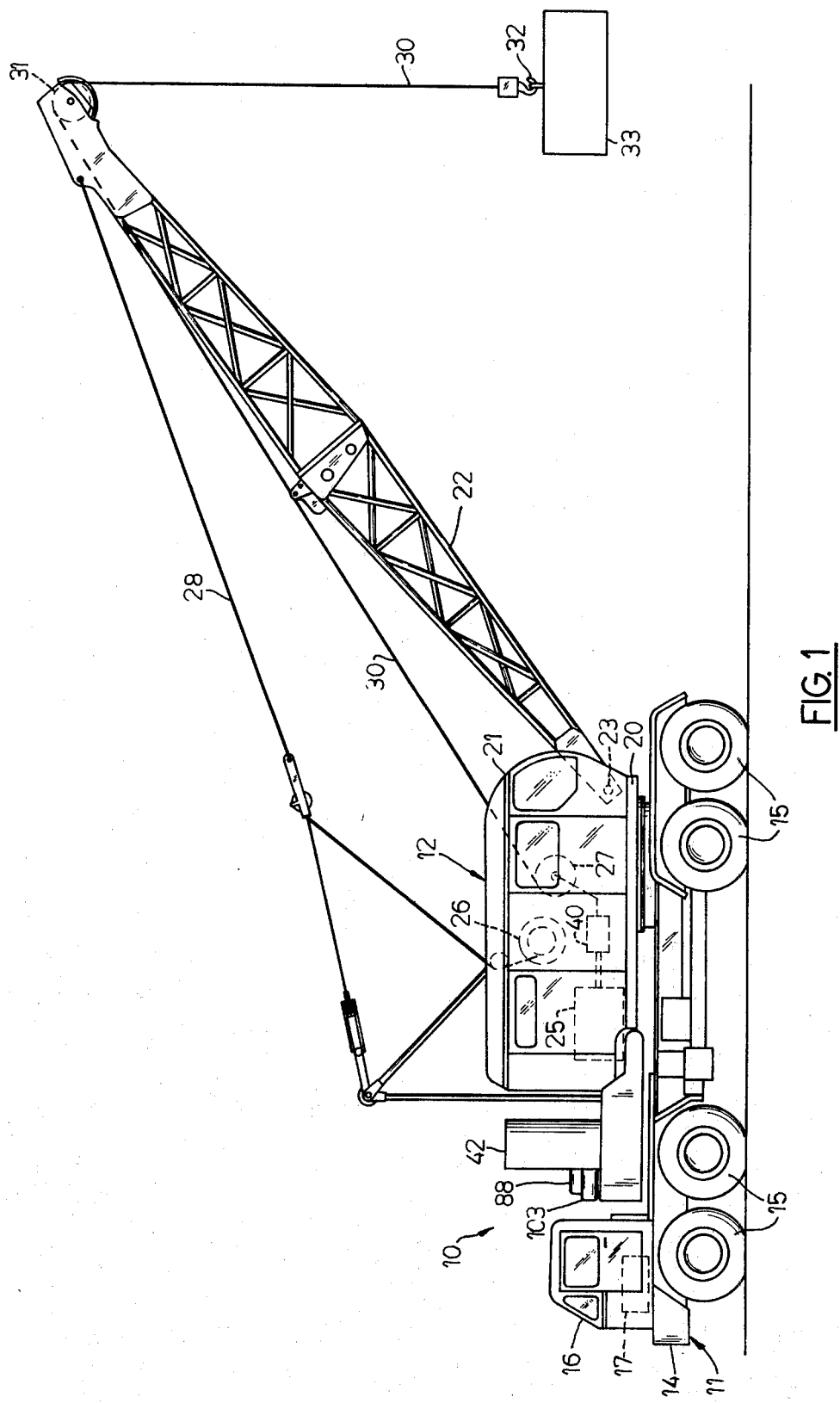
FIG. 1 is a side elevational view of a mobile crane employing a hoist drum drive having a controlled kinetics torque converter in accordance with the invention.

Referring to FIG. 1, the numeral 10 designates a mobile crane in accordance with the invention and comprising a mobile lower section or carrier 11 and a rotatable upper section 12 mounted on the carrier in a conventional manner. Carrier 11 comprises a chassis 14 having a plurality of suitable ground wheels 15, some of which are driven wheels, and a driver's cab 16. An internal combustion engine 17 for propulsion is located under cab 16 and supplies operating power to the driven ground wheels 15 of carrier 11.

The upper section 12 includes a rotatable base or platform 20 on which there is mounted a cab structure 21 and a crane boom 22 which can be raised or lowered about a pivot point 23. Platform 20 also supports a prime mover 25 in the form of an internal combustion (Diesel) engine which supplies operating power for a boom hoist drum 26 and a load hoist drum 27. Suitable boom hoist lines 28 are wrapped around boom hoist drum 26 and connected at their remote end to a point on boom 22. Boom hoist drum 26 can be driven in opposite directions to raise and lower boom 22. A hoist line 30 is wrapped around load hoist drum 27 and is reeved over a sheave 31 on an end point of boom 22 and is provided at its free end with a hook 32 to which a load 33 is attached. A controlled kinetics torque converter 40 is mounted on platform 20 and is connected between engine 25 and load hoist drum 27. Platform 20 also carries a settling tank or degasser 42 in the form of an elongated upright tank hereinafter described in detail and also supports certain pumps, hydraulic components and hydraulic controls for hoisting, holding and lowering load 33, as hereinafter described in detail.

In an actual embodiment of the invention which was tested, mobile crane 10 took the form of a Harnischfeger Model 650A T.C. truck mounted crane of 50 ton rated capacity having a 70 foot boom and a one-part line on the first layer of the load hoist drum with the hoist drum being driven by a Cummins Diesel engine. The torque converter 40 took the form of a Twin Disc three stage stationary housing torque converter modified in accordance with the invention. During testing, loads of 350 to 20,850 pounds were lifted and lowered with the engine operating at high idle (about 2100 rpm) and at the lowest engine speed that would raise the load. The tested system used a working medium in the torque converter in the form of a mixture ranging from mostly gas (air) to mostly liquid (oil). Testing with various loads and engine speeds demonstrated that the load was fully controllable during hoisting a maximum or minimum load at full speed, while holding the load steady, and during lowering of the load, including allowing the load to fall by gravity. No inherent instability could be provoked in the control of power transmission.

Figure 2:
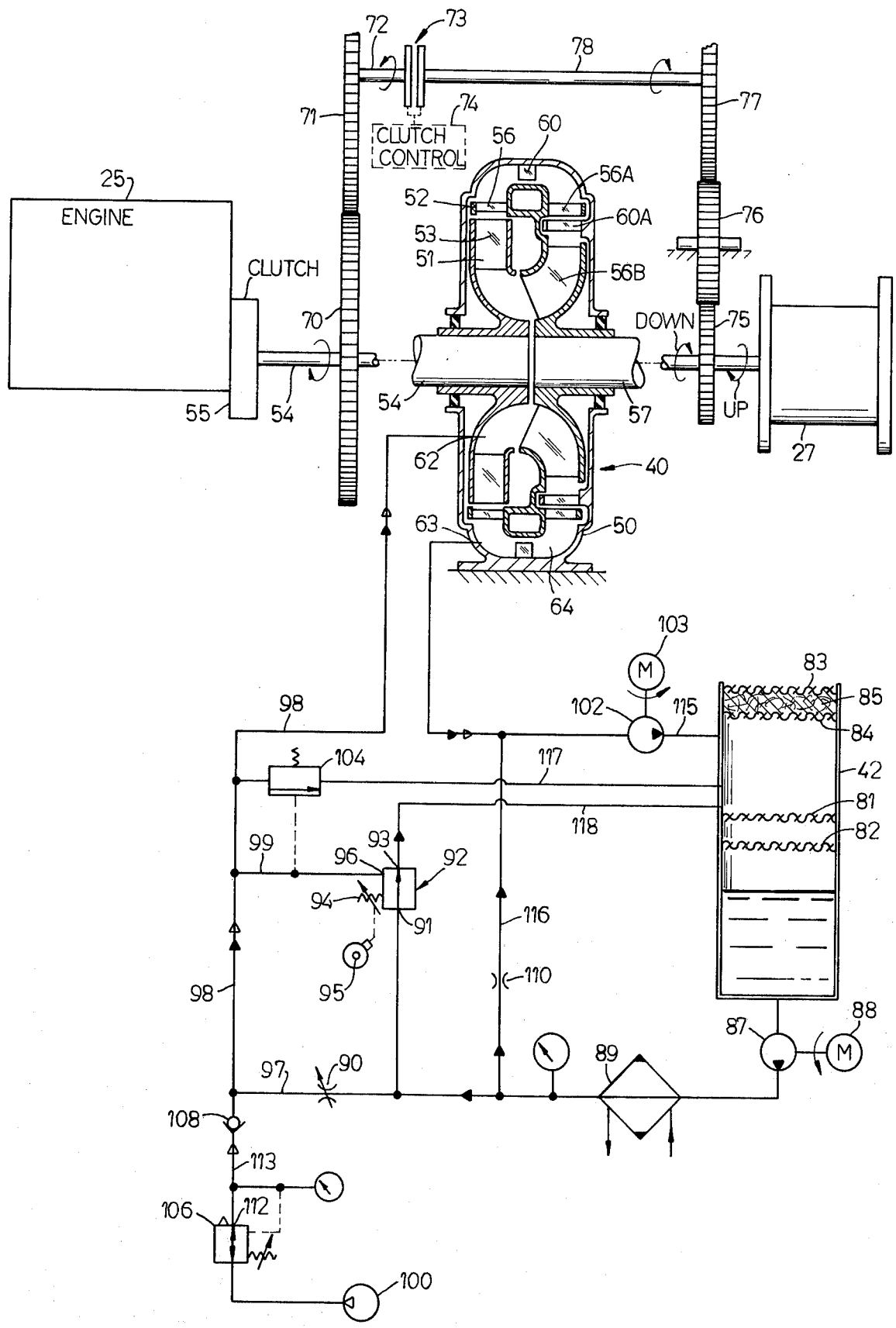
FIG. 2 is a schematic diagram showing the prime mover, the controlled kinetics torque converter, the power down and reverse gears, and the hoist drum of FIG. 1 and further showing a control system for supplying, for varying the density of, and for preventing cavitation in the working fluid of the controlled kinetics torque converter.

Referring now to FIG. 2, there is shown a schematic diagram of the engine 25, the controlled kinetic torque converter 40, the hoist drum 27, a power down and reverse gearing arrangement hereinafter described, and a system for providing a variable density working fluid to control the torque converter 40 and for pressurizing the working fluid to prevent cavitation.

The controlled kinetics converter 40 is of conventional design, except as modified in accordance with the invention, and is shown in FIG. 2 as a multiple stage type having a stationary housing 50, an impeller wheel 51 and a turbine wheel 52. Impeller blades 53 are mounted on the impeller wheel 51 which is driven by an input shaft 54. Shaft 54 is connected through a conventional clutch 55 to the output shaft of engine 25. Turbine blades 56 (first stage), 56A (second stage), and 56B (third stage) are mounted on the turbine wheel 52 which drives an output shaft 57 connected to hoist drum 27. Stator blades 60 (first stage) and 60A (second stage) are mounted on the housing 50 which is grounded or stationary. Shafts 54 and 57 are understood to be supported for rotation by bearings (not shown) in a conventional manner. Housing 50 is provided with a working fluid inlet port 62 for injection of a mixture of cool oil and air and with a working fluid outlet port 63 for removal of a mixture of hot oil and air from the torus 64 of the housing.

Although a multiple stage stationary housing type torque converter 40 is shown, the torque converter could be of the single stage type or of the rotating housing type or of the rotating turbine housing type or of the free wheeling stator type. Furthermore, the inlet port 62 through which a mixture of liquid and gas is supplied could take the form of two separate ports (not shown), one for liquid and one for gas, provided suitable design changes in the supply circuits were carried out.

As will be understood, when engine 25 is in operation and clutch 55 is engaged, the turbine 52, which is initially stationary, will begin to rotate as the momentum of the working fluid (oil or a mixture of oil and air) provided by the impeller 51 is absorbed by the turbine and output shaft 57 is thus accelerated. When the turbine 52 is stopped, the torque converter 40 is "stalled" and the fluid flow in torus 64 is predominantly along the design path of the turbine, with a lessor component of motion along the axis of the torus. This helical fluid flow path provides a speed reduction from input shaft 54 to output shaft 57 with a commensurate torque increase. As the speed of turbine 52 approaches that of the impeller 51, the fluid flow is predominantly along the axis of the torus 64 and the output torque drops to the level of the input torque.

The input shaft 54 of torque converter 40 is provided with a set of power down drive gears including a gear 70 mounted on and rotatable with input shaft 54. Gear 70 is in constant mesh with a gear 71 which is mounted on and rotatable with one shaft 72 of a conventional selectively controllable slip controlled power down clutch 73. The output shaft 57 of torque converter 40 is provided with a set of reverse gears including a gear 75 which is mounted on and rotatable with shaft 57. Gear 75 is in constant mesh with a reversing gear 76 and the latter is in constant mesh with a gear 77 which is mounted on and rotatable with another shaft 78 of the slip controlled clutch 73. During operation of the crane, powering down is accomplished by selectively engaging clutch 73 by means of clutch control 74. More specifically, the clutch 73 is "slipped in" as desired after oil flow to the torque converter 40 is at a minimum as hereinafter explained. The ratio of the power down drive can be made higher than one-to-one so that the down speed of the hoist drum 27 is greater than the up speed; the only limit being the centrifugal strength of the torque converter 40 and its associated parts being driven in reverse. Stopping a load at a high down speed is accomplished by releasing the power down clutch 73 and increasing the rate of flow of oil to the torque converter 40 thereby giving the torque converter an "up drive" capacity. Torque converter 40 being of the stationary housing type can stop any load it is capable of lifting regardless of the down speed of the load. However, in the case of a torque converter having a rotating housing (not shown), certain physical limitations would be involved.

As FIG. 2 shows, the system and apparatus for supplying and removing working fluid from the torque converter comprises the following elements, namely, a settling tank or degasser 42, an oil supply or inlet pump 87 for supplying oil from the settling tank 42 to the torque converter 40, an air compressor 100 for supplying compressed air to the torque converter 40, a fluid discharge or outlet pump 102 for removing the working fluid from the torque converter 40 and delivering it to the settling tank 42, a selectively operable manually controlled main gate valve 90, an oil flow regulator valve 92, a pressure relief valve 104, an air pressure regulator valve 106, a check valve 108 for preventing oil from entering the air supply system, and a fluid flow orifice 110 for supplying lubricating oil to pump 102.

The volume of oil being supplied by pump 87 can be regulated between zero to some maximum figure, such as zero to 70 gallons per minute, as required by the power capacity of the torque converter 40, as a result of the operator's manipulation of manually adjustable gate valve 90. The relief valve 104 limits maximum pressure in the torus to a desired valve such as for example 70 psi. The discharge pump 102 which is a fixed displacement pump delivers the working fluid from the torque converter in a volume which is slightly less than the maximum volume that pump 87 can deliver so that, when pump 87 is delivering maximum volume, relief valve 104 will be spilling oil to the settling tank 42. The fluid delivered from the output of pump 102 is passed through the degasser and settling tank 42 so as to remove most of the entrained air, which is then vented through the top of the settling tank.

Settling tank or degasser 42 initially contains about 55 gallons of liquid, such as oil, which is to serve in the working fluid for the torque converter. In practice, the oil could take the form of SAE 10W engine oil, diesel fuel or equal volumes or mixtures thereof. Settling tank 42 is on the order of about 10 feet high and about 2½ feet in diameter. Settling tank 42 is provided near its midpoint with two layers 81 and 82 of small mesh copper screen which are spaced about 6 inches apart and has a fine mesh material such as steel wool 85 disposed between the screens 83 and 84.

Oil is removed from the bottom of the settling tank 42 at the rate of 70 gallons per minute by a gear-type constant displacement pump 87 driven by an electric motor 88 which for example may take the form of a 7½ horsepower, 1800 rpm motor or by a gear drive from engine 25. Oil from pump 87 is circulated through a conventional torque converter fluid-to-engine water heat exchanger 89 which is mounted on engine 25. Oil then flows from the heat exchanger 89 to the gate valve 90 and to the input port 91 of regulator valve 92. Regulator valve 92 comprises a piston (not shown) which acts against the incoming fluid at port 91 to limit the output fluid flow from the output port 93. The flow limiting force exerted by the piston (not shown) is normally provided by a spring 94 acting against the piston (not shown). The preloading of spring 94 is manually adjustable by means of an external hand wheel 95. Valve 92 is provided with a port 96 which communicates by means of supply lines 97, 98, and 99 with the discharge side of the gate valve 90. The air and/or oil pressure on the discharge side of the gate valve 90 varies as oil flow through the system is varied by manually adjusting the gate valve 90 and as converter characteristics change. This fluid pressure acts against the piston (not shown) in the regulator valve 92 in the same direction as the spring 94. When gate valve 90 is closed, only air pressure from check valve 108 will act on the piston (not shown) of the regulator valve 92, and only the slight preload pressure of spring 94 plus the air pressure from check valve 108 restricts or limits flow through the regulator valve 92. When gate valve 90 is opened, thereby feeding more oil to the torque converter 40, more oil is supplied to the piston (not shown) of regulator valve 92 thereby decreasing the oil flow through the regulator valve 92. The effect of this arrangement is to provide a constant pressure drop across gate valve 90. This provides a low-cost equivalent of a variable displacement inlet pump which, otherwise, could be used in place of constant displacement oil pump 87.

Air compressor or air supply pump 100 provides air through the air pressure regulator 106 at a constant pressure of 40 to 50 psi into the torque converter 40. The outlet port 112 of air pressure regulator 106 is connected by a supply line 113 to hereinbefore mentioned supply line. Supply line 113 is provided with check valve 108 which prevents oil from flowing back into the air supply. The pressure relief valve 104, which is connected between supply line 98 and settling tank 42, is set to open, for example, at 70 psi to prevent damage to the system in the case of blockage of fluid flow in the system.

The main supply line 98 supplies an oil/air mixture to port 62 of torque converter 40. If gate valve 90 is closed, pure air flows into the torque converter 40 (incidentally assisting pump 102 in removing oil from the torque converter 40). Flow of pure air stops power transmission through torque converter 40 and allows the load 33 on the hoist drum 27 to drop of its own weight, its speed of descent being limited only by the friction of the machinery between the torque converter 40 and the hoist drum 27. As the gate valve 90 is opened, increasing amounts of oil are added to the air being fed to the torque converter through main supply line 98. The spinning of the impeller 51 and the turbine 52 mixes the incoming air and oil into a mixture of an apparently stable, homogenous density. When the gate valve 90 is fully opened, oil is supplied at, for example, 60 psi to the torque converter 40. This oil pressure overrides the 40 to 50 psi air pressure, thereby closing the check valve 108, and enabling only oil to be supplied to the torque converter 40. Under this condition, the torque converter 40 performs like a normal torque converter, providing the as-designed input and output speed and torque relationships or characteristics. By providing air at 40 to 50 psi, the pressure in the torque converter 40 never falls below this predetermined pressure level or valve, regardless of the air to oil proportions, and this prevents formation of cavitation bubbles in the torque converter, thereby eliminating loss of control and possible damage due to cavitation.

The air or oil or air/oil mixture which is serving as the working fluid in the torque converter 40 is removed therefrom by the gear-type constant displacement pump 102 which is driven for example by a 7½ horsepower electric motor 103 at a speed of 1200 rpm or by a gear drive from engine 25. Pump 102 removes the working fluid at the rate of 40 gpm, for example. To prevent damage to pump 102 when gate valve 90 is closed, an ⅛ inch orifice valve 110 is provided in a supply line 116 to supply oil from oil supply line 97 ahead of gate valve 90 to the inlet side of pump 102.

In practice, the pumps 87 and 102 may be identical in size and construction but they are driven at different speeds by their respective electric motors or the engine P.T.O. so that when the gate valve 90 is opened to fill the torque converter 40, the pump 87 operating at 1800 rpm can fill the torque converter faster than the pump 102 driven at 1200 rpm can empty it. Or, the pumps may be duplex pumps of unequal capacity driven at the same speed.

The output of the outlet or discharge pump 102 is connected by means of a fluid line 115 to the settling tank 42 at a point between the screens 81 and 84. Similarly, any oil from relief valve 104 passes through a fluid line 117 and discharges into settling tank 42 between the screens 81 and 84. Any overflow from regulator valve 92 discharges through a fluid line 118 into settling tank 42 between the screens 81 and 84. The lower screens 81 and 82 in settling tank 42 provide a surface to break up entrapped air bubbles in the mixture being discharged from the torque converter 40. The upper screens 83 and 84 and the steel wool 85 in settling tank 42 condense any oil mist arising in the settling tank and prevent excessive oil loss. If preferred the gas exiting the tank 42 could be recovered and fed to the compressor 100.

OPERATION

Assume input shaft 54 is turning at constant speed and the operator wishes less output torque, power, or speed. To attain this, the operator reduces the displacement of oil supplied by pump 87 to less than that withdrawn by pump 102 by means of operation of gate valve 90. Torus pressure falls to that set by air regulator 106, and air is admitted at a rate to make up the excess flow volume of pump 102 over pump 87. The average density of the fluid in the circuit is reduced by the volume of air admitted. Constant speed impeller 51 keeps the flow "foamed up," and thus the torque converter 40 is reduced in capacity by the "density" reduction of the working fluid. Pump 102 removes a constant volume of "foamed up" fluid, and pump 87 and air compressor 100 supply the fluids necessary to maintain the mixture at proper density. Should the operator desire still lower capacity, he reduces the oil output from pump 87 to the torque converter by closing gate valve 90 further and the density is further reduced. Thus, the output power, torque, or speed is reduced, and the input demand from the prime mover or engine 25 is also reduced.

At some low oil flow from pump 87, the torque converter capacity will be extremely low allowing conventional brakes (not shown) to easily handle the "creep."

"Power down" can easily be applied by a reverse drive to the turbine 52 as follows. The clutch 73 is "slipped in" as desired after oil from pump 87 is at minimum flow.

Stopping a load at a high down speed is accomplished by releasing the down clutch 73 and increasing the flow from pump 87 giving the torque converter 40 "up drive capacity."

The essence of the system is that the constant speed impeller wheel 51 keeps the liquid and gas well "foamed up;" the outlet pump 102 removes a constant volume of this mixture; the inlet pump 87 supplies a smaller but adjustable volume of pure liquid, the difference being made up by the admission of the necessary volume of compressed gas from air compressor 100. Thus, the density of the fluid in the torus is held fixed at some desired density by the ratio of the volume of liquid and the volume of gas.

I claim:

1. In combination:
    a torque converter;
    means for supplying to said torque converter a working fluid comprising a mixture of liquid and gas, said mixture being supplied at a predetermined but selectively variable volumetric rate;
    means for selectively varying the volumetric proportion between the volume of liquid and gas supplied to said torque converter;
    means for maintaining said working fluid at a pressure sufficient to inhibit cavitation;
    means for removing working fluid from said torque converter at a fixed volumetric rate; and
    degasser means for receiving the working fluid removed from said torque converter and for separating said liquid from said gas and for recovering said liquid.

2. A combination according to claim 1 wherein said means for supplying said working fluid comprises a first pump for supplying said liquid and a compressor for supplying said gas; wherein said means for selectively varying the volumetric proportion comprises a gate valve; and wherein said means for removing working fluid from said torque converter comprises a second pump.

3. A combination according to claim 2 wherein said degasser means is connected to said second pump and is further connected to said first pump to supply recovered liquid thereto.

4. A combination according to claim 3 wherein said degasser means comprises a tank having a gas exhaust near its upper end and having a pair of vertically spaced apart screens therein, wherein said second pump discharges between said pair of spaced apart screens, and wherein said first pump has its inlet connected below the lower one of said vertically spaced apart screens.

5. A combination according to claim 4 wherein said second pump is a fixed displacement pump and wherein said first pump is a fixed displacement pump and said gate valve selectively controls the rate of flow from said first pump to said torque converter.

6. A combination according to claim 5 wherein said first and second pumps are of the same size and wherein said first pump is driven faster than said second pump.

7. In a crane:
    a hoist drum rotatable in hoist and lower directions;
    a prime mover for driving said hoist drum;
    a controlled kinetics torque converter operatively connected between said prime mover and said hoist drum;
    a "power down" drive assembly operatively connected between said prime mover and said hoist drum and including a clutch;
    clutch control means to selectively engage and disengage said clutch; and
    control means for supplying a variable density working fluid to said torque converter and for maintaining said working fluid at a pressure sufficient to inhibit cavitation in said working fluid, said control means further including means to selectively vary the density of said working fluid.

8. A crane according to claim 7 wherein said variable density working fluid comprises a mixture of liquid and gas.

9. A crane according to claim 8 wherein said liquid is oil and said gas is air.

10. A crane according to claim 8 wherein said means to selectively vary the density of said working fluid includes means for selectively varying the volumetric proportion between said liquid and said gas.

11. A crane according to claim 10 wherein said control means includes means for supplying said gas under pressure so as to maintain a pressure on said mixture sufficient to inhibit cavitation.

12. In a crane:
    a hoist drum rotatable in "hoist" and "lower" directions;
    a prime mover for driving said hoist drum;
    a controlled kinetics torque converter operatively connected between said prime mover and said hoist drum, said torque converter having a torus therein;
    a "power down" drive assembly operatively connected between said prime mover and said hoist drum and including a clutch;
    clutch control means to selectively engage and disengage said clutch; and
    control means for said controlled kinetics torque converter including:
    first means for supplying a liquid to said torus;
    means for selectively regulating said first means to vary the volume of liquid supplied to said torus;
    second means for supplying compressed gas to said torus at a predetermined rate; and
    third means for removing fluid from said torus at a fixed rate.

13. A crane according to claim 12 wherein said first means comprises a fixed displacement pump and valve means for selectively controlling the rate of flow from said fixed displacement pump to said torus.

14. A crane according to claim 13 wherein said fixed displacement pump of said first means and said fixed displacement pump of said third means are of the same size and wherein said fixed displacement pump of said first means is driven faster than said other fixed displacement pump.

15. In combination:
    a torque converter having a fluid inlet port and a fluid outlet port;
    a first fixed displacement pump having an inlet port and an outlet port;
    a first supply line connected between said outlet port of said first pump and said fluid inlet port of said torque converter;
    an air compressor having an outlet port;

a second supply line connected between said outlet port of said air compressor and a point in said first supply line;

an air pressure regulator valve connected in said second supply line between said air compressor and said point;

a selectively operable gate valve connected in said first supply line between said first pump and said point;

an oil flow regulator valve having an inlet port, an exhaust port, and a pressure port, said inlet port being connected to said first supply line between said first pump and said gate valve, said pressure port being connected to said first supply line between said point and said fluid inlet port of said torque converter;

a second fixed displacement pump having an inlet port and an outlet port; and a fluid exhaust line connected between said fluid outlet port of said torque converter and said inlet port of said second pump.

16. A combination according to claim 15 including a degasser and settling tank having a gas outlet near its top, and wherein said inlet port of said first pump is connected to said tank to a first port near the bottom thereof, wherein said outlet port of said second pump is connected to said tank to a port therein located above said first port, and wherein said exhaust port of said oil flow regulator valve is connected to said tank at a port above said first port.

17. A combination according to claim 16 wherein said settling tank includes a first screen between said first port and said other ports.

18. A combination according to claim 17 wherein said settling tank includes a second screen near the open top of said settling tank.

19. A combination according to claim 15 including a check valve in said second fluid line between said air pressure regulator valve and said point.

20. A combination according to claim 19 including a third fluid supply line connected between said outlet port of said first pump and said inlet port of said second pump, said third fluid supply line having a fluid flow control orifice therein.

21. A method of operating and controlling a torque converter having an impeller and a turbine comprising the steps of:

supplying a variable density working fluid to said torque converter at a predetermined volumetric rate;

maintaining the working fluid above a predetermined pressure level to inhibit cavitation in said working fluid;

varying the density of the working fluid supplied to said torque converter to effect regulation of the power output of the latter; and removing the working fluid from said torque converter at a fixed volumetric rate which is less than the maximum predetermined volumetric rate.

22. A method of operating and controlling a torque converter having an impeller and a turbine comprising the steps of:

supplying a mixture of liquid and gas to said torque converter to provide a working fluid therefor;

maintaining said mixture above a predetermined pressure level to inhibit cavitation of said working fluid; and selectively varying the proportion between the volume of liquid and gas to vary the density of said working fluid to thereby vary the output of the torque converter.

23. A method according to claim 22 inlcuding the step of removing working fluid from said torque converter at a fixed volumetric rate which is less than the maximum rate at which the mixture can be supplied to said torque converter.

24. A method according to claim 23 including the step of separating the liquid and gas removed from said torque converter and recovering said liquid.

25. A method of operating and controlling a torque converter having an impeller and a turbine comprising the steps of:

supplying liquid to said torque converter;

supplying gas to said torque converter above a predetermined pressure and at a fixed volumetric rate;

selectively varying the volumetric rate at which liquid is supplied to said torque converter to regulate the output of said torque converter; and removing the mixture of liquid and gas from said torque converter at a fixed volumetric rate which is less than the maximum volumetric rate at which liquid can be supplied to said torque converter.

26. A method according to claim 25 including the step of separating the liquid and gas removed from said torque converter and recovering said liquid.

* * * * *